Figure 1:
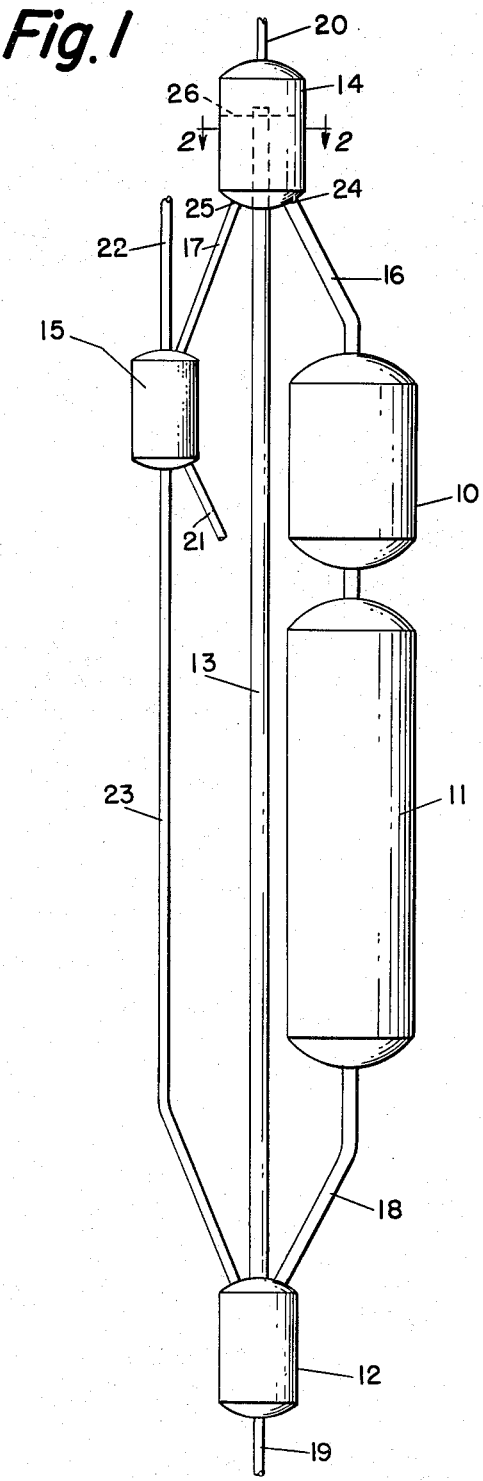

April 17, 1956 W. L. McCLURE 2,742,343
CIRCULATION OF GRANULAR SOLIDS THROUGH A PROCESS SYSTEM
Filed Oct. 9, 1951 2 Sheets-Sheet 1

*INVENTOR.*
WILLIAM L. McCLURE
BY
*Busser and Smith*
ATTORNEYS

April 17, 1956 W. L. McCLURE 2,742,343
CIRCULATION OF GRANULAR SOLIDS THROUGH A PROCESS SYSTEM
Filed Oct. 9, 1951 2 Sheets-Sheet 2

*INVENTOR.*
WILLIAM L. McCLURE
BY
ATTORNEYS

United States Patent Office 2,742,343
Patented Apr. 17, 1956

2,742,343

CIRCULATION OF GRANULAR SOLIDS THROUGH A PROCESS SYSTEM

William L. McClure, Toledo, Ohio, assignor to Sun Oil Company, Philadelphia, Pa., a corporation of New Jersey Application October 9, 1951, Serial No. 250,458

6 Claims. (Cl. 23—1)

This invention relates to the circulation of coarse granular solids through a process system and more particularly to an improved manner of withdrawing from the main bulk of the granular solids in the process system a side stream of solids from which are to be removed relatively fine granular solids produced by attrition of coarse granular solids during circulation through the process system.

It is known in the art to circulate coarse granular solids through a system of apparatus, including contacting zones wherein the granular solids are contacted with gaseous material in order to effect some desired action upon the gaseous materials, and also including means for elevating granular solids, after passage through such contacting zones, to a level above the contacting zones in order that they may gravitate from that level through the contacting zones again as a compact mass of granular solids.

Coarse granular solids, as the term is used herein, is intended to indicate a mixture of solid particles, a major proportion of which are large enough to be retained on a 20 mesh U. S. Sieve Series screen. When such granular solids are circulated through a system as previously described, they undergo attrition to a limited extent, provided that they are frangible solids as they frequently are in commonly practiced commercial processes involving the circulation of coarse granular solids. It is necessary to remove the relatively fine particles, which are thus formed, from the main bulk of the solids in order that the proportion of relatively fine solids in the mixture does not become excessively high. It is necessary to remove the fine solids also because they produce adverse effects in many of the contacting processes which are commonly practiced. For example, in the conversion of hydrocarbon material by contact with a moving compact bed of coarse granular solids the presence of a high proportion of fine solids in the compact bed produces adverse results which must be guarded against.

In order to remove fine solids from a mixture as previously described, it has been the practice previously to withdraw a side stream from the main bulk of the solids after the solids have been elevated to a position above the contacting zones, but before the solids have been introduced into the uppermost of the contacting zones. The side stream thus removed is then conveyed to an elutriating vessel wherein the relatively fine particles in the mixture are separated, usually pneumatically, from the relatively coarse particles in the mixture and the coarse particles from which fine particles have been removed are then reintroduced into the main bulk of solids in the system.

Heretofore the most commonly used manner of elevating granular solids to a level higher than the contacting zones has been by mechanical means, for example, a bucket elevator. After reaching the desired higher level the solids have been discharged from the bucket elevator into a conduit through which the solids gravitate into a supply hopper positioned above the contacting zones. The side stream which is withdrawn to the elutriating vessel has previously been withdrawn from the solids gravitating through this conduit and the apparatus which has been provided for withdrawing the side stream has consisted of a branch conduit communicating with and depending from the conduit through which the main bulk of the solids travels, the latter conduit being generally inclined.

It has been recognized in the prior art that it is advisable to withdraw a side stream for elutriation which has a higher percentage of fines therein than the main bulk of the solids which passes into the contacting zones. For example, U. S. Patent 2,434,843, issued January 20, 1948 to Frank C. Fahnestock, discloses a manner of withdrawing a side stream containing a high percentage of fines from a solids conduit through which granular solids gravitate from a mechanical elevator to a supply hopper. This disclosure, though providing a suitable method for accomplishing the desired result when a mechanical elevator is used, has been found to have certain disadvantages for use in a system where the solids conduit from which the elutriator stream is withdrawn must function as a seal leg above the contacting zones. For example, when a gas lift is employed to elevate the solids, it is customary to collect the granular solids, after separation thereof from the lifting gas in the lower portion of a disengaging vessel situated above the contacting zones and to pass granular solids downwardly as a compact mass from the lower portion of the disengaging vessel into the contacting zones. The compact mass of solids gravitating through the conduit between the disengaging vessel and the contacting zones constitutes a seal leg which is extremely important to establish and maintain, when, as is frequently the case, the contacting zones are under elevated pressure. By functioning as a seal leg the compact mass of solids gravitating through the conduit between the disengaging vessel and the reaction zones prevents the gaseous materials in the reaction zones from passing upwardly to any substantial degree through that conduit. The necessity of maintaining a seal leg between the disengaging vessel and reaction zones in a system as previously described makes it disadvantageous to remove a side stream for elutriation from the conduit which provides the seal leg, because such removal shortens the effective height of the seal leg, since only that part of the seal leg which is beneath the point of withdrawal of the side stream is effective as a seal leg. Therefore, prior to the present invention it has not been recognized that it is possible in a system as herein contemplated to avoid the disadvantages of withdrawing the elutriator side stream from the seal leg above the contacting zones, and to nevertheless withdraw a side stream for elutriation which contains a higher percentage of fines than the main bulk of the solids in the system.

According to the present invention a side stream for elutriation is withdrawn from a lower portion of a solids hopper as a stream separate from the stream which passes from the hopper into the reaction zones. The manner of removal of the separate side stream for elutriation is such that the mass of granular solids in the lower portion of the hopper is caused to have a distribution of fine granular solids therein which results in a larger proportion of fines entering the side stream than the proportion which enters the stream passing to the contacting zones.

Figure 2:
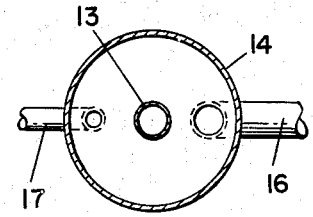
Figure 3:
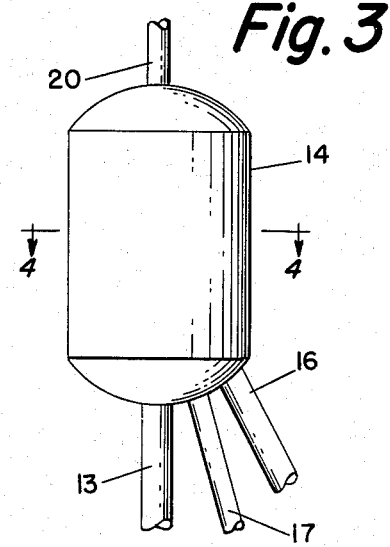
Figure 4:
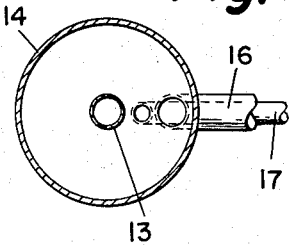
Figure 5:
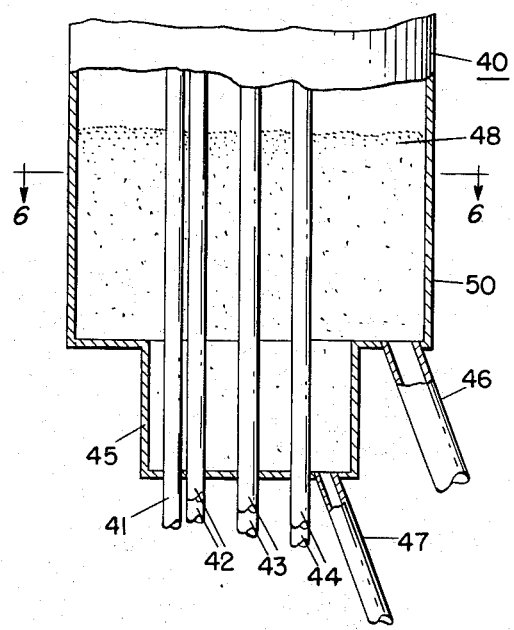
Figure 6:
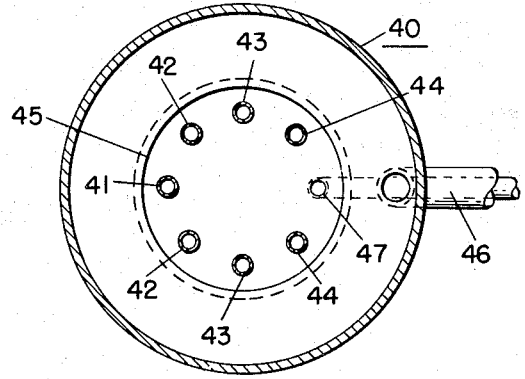

The invention will be further described with reference to the attached drawing which illustrates apparatus which can be used to secure the advantages of the present invention. Figure 1 shows a solids circulation system including a gas lift disengager, and Figure 2 is a horizontal cross section of the disengager. Figures 3 and 4 show a modification of the outlets from the disengager. Figures 5 and 6 show a disengager for use with multiple lift conduit apparatus.

Referring first to Figure 1, there is shown therein a system of apparatus through which granular solids are circulated, the apparatus including a gas lift for granular solids from a low point in the system to a high point therein. The apparatus shown in Figure 1 includes a contacting vessel 10 which may be, for example, a hydrocarbon conversion vessel, a second contacting vessel 11 beneath vessel 10; the vessel 11 may be, for example, a regeneration vessel in which granular solids which have had carbonaceous materials deposited thereon in vessel 10 can be regenerated by burning the carbonaceous deposits therefrom. The apparatus illustrated also includes a gas lift engaging vessel 12, a lift conduit 13, a disengaging vessel 14, and an elutriating vessel 15. Communicating with a lower portion of disengager 14 is a seal leg conduit 16 communicating at its lower end with the top of vessel 10. Also communicating with the lower end of disengager 14 is a side stream conduit 17 communicating at its lower end with elutriator 15. Referring to Figure 2, which is a sectional view of disengager 14, it is seen that the center of the side stream conduit 17 and the center of the seal leg conduit 16 both lie upon the same diameter of the circular cross section of disengager 14. This particular location of the conduits 16 and 17 is preferred according to the invention in that it provides particularly beneficial operation as subsequently described.

In operation granular solids gravitate through vessels 10 and 11 in series as a compact mass. The solids then gravitate through line 18 into engager 12 wherein they are suspended in lifting gas introduced through line 19 and are elevated by the lifting gas through lift conduit 13 into disengager 14. The granular solids reverse their direction of upward movement in disengager 14 and fall into the bottom of disengager 14 where they are collected as a compact mass. Lifting gas from which the main bulk of the granular solids has been separated is removed from disengager 14 through line 20. The compact mass of solids gravitates through the lower portion of disengager 14, which acts as a supply hopper for solids, and one relatively larger portion of the solids enters seal leg conduit 16 while another relatively smaller portion of the solids enters side stream conduit 17 and is introduced into elutriator 15 through which it passes as a freely falling stream countercurrent to rising gas introduced into elutriator 15 through line 21. The gas entrains the relatively fine particles in the falling solids and the gas containing fines in suspension is withdrawn from elutriator 15 through line 22. The relatively coarse particles from which fines have been removed by elutriation are withdrawn from elutriator 15 through line 23 and introduced into engager 12.

In operation as above-described the solids in side stream conduit 17 contain a higher proportion of fines than the solids which pass through seal leg conduit 16. This result is accomplished in the following manner: The solids which enter seal leg conduit 16 have previously moved through the lower portion of disengager 14 as an inverted frustoconical stream of solids converging toward the outlet 24 which communicates with seal leg conduit 16. The sides of this frustoconical stream are inclined at an angle with the horizontal known as the apparent angle of repose. This angle, as defined on page 219 of the April 25, 1945, issue of the Transactions of the American Institute of Chemical Engineers is the angle assumed by the frustoconical interface between static solids and moving solids in a vessel, which interface is established when solids gravitate as a compact mass through an outlet from the vessel. The apparent angle of repose varies with different mixtures of granular solids, but for each mixture, the apparent angle of repose is definite and can be readily determined by a person skilled in the art. As the solids in this frustoconical stream pass downwardly toward the outlet 24, the fine solids in the mixture become concentrated near the undersurface of the frustoconical stream, i. e., near the interface between the solids which are gravitating toward outlet 24 and the other solids in the compact mass which are not gravitating toward that outlet. The granular solids which gravitate toward the outlet 25 which communicates with side stream conduit 17, are contained in a second smaller frustoconical stream which converges toward outlet 25 and the second stream intersects the first frustoconical stream in such fashion that a portion of the solids which are passed downwardly into the side stream conduit 17 includes a portion of the relatively fine solids which have become concentrated along the undersurface of the larger frustoconical stream. In this manner the stream which enters the side stream conduit 17 has selectively withdrawn fine particles from the stream which enters the seal leg conduit 16 so that the latter stream contains a lower proportion of fines than the stream which enters side stream conduit 17.

In order for the above effect to be obtained it is necessary that the seal leg conduit 16 have a larger capacity than the side stream conduit 17 in order that the rate of flow of solids in the frustoconical stream converging toward the seal leg conduit 16 be greater than the rate of flow of the stream converging toward the side stream conduit 17. When this is the case the latter stream selectively removes fine particles from the seal leg stream rather than the seal leg stream selectively removing fine particles from the side stream, which would be the case if the capacities were reversed, and rather than having a balance between the fines concentrations in both streams, which would be the case if the two conduits 16 and 17 had equal capacities.

It is to be understood that in the preferred embodiment of the invention wherein outlets from the disengager to the seal leg conduit and to the side stream conduit have their centers upon the same diameter of the disengaging vessel it is possible for both outlets to be positioned on the same side of the disengaging vessel as well as in opposite sides of the disengaging vessel as shown in Figures 1 and 2. Referring to Figures 3 and 4, for example, the seal leg conduit 16 and the side stream conduit 17 are so positioned that their outlets are adjacent to each other and have their centers upon the same diameter of the disengager 14. It is to be understood that they can also occupy any other suitable relative positions provided that their centers are upon a common diameter of disengager 14. Such arrangement is preferred according to the invention, since it provides a particularly great differential between the fines concentrations in the seal leg stream and in the elutriator side stream respectively.

The invention can be advantageously employed in a system involving the use of a plurality of lift conduits, all communicating with a single disengaging vessel. Such a system is described, for example, in copending application Serial No. 203,323, filed December 29, 1950, by Clarence H. Thayer. Figures 5 and 6 illustrate the application of the present invention to such a multiple lift conduit system. In Figures 5 and 6, 40 represents a disengaging vessel which can be employed in a system as illustrated in Figure 1, the disengager 40 being used in place of disengager 14, and the lift conduits 41, 42, 43 and 44 in place of the single lift conduit 13 as illustrated in Figure 1. Disengager 40 is cylindrical in cross section and has a lower portion 45 having cylindrical cross section, the area of its cross section being less than that of the cross section of the upper portion 50 of disengager 40. Communicating with the bottom of the upper portion 50 of disengager 40 is a seal leg conduit 46 and communicating with the bottom of the lower portion 45 of disengager 40 is a side stream conduit 47.

In operation granular solids suspended in lifting gas are passed upwardly through the lift conduits 41, 42, 43, and 44 and are discharged into a discharge portion, not shown, of disengager 40. This discharge portion can conveniently be substantially as shown in copending application 203,323, of Clarence H. Thayer, now Patent No. 2,674,498, issued April 6, 1954. The direction of vertical movement of the granular solids is reversed and the solids fall downwardly in disengager 40 and are collected as a compact bed 48 which gravitates through the portions 50 and 45 of disengager 40 and into the seal leg conduit 46 and the side stream conduit 47. The solids which gravitate into seal leg conduit 46 move in a frustoconical stream converging toward the conduit 46. The fine particles which concentrate near the undersurface of that frustoconical stream are selectively withdrawn from that stream and pass downwardly into the lower portion 45 of disengager 40. Thus, the solids in the lower portion 45 contain a higher percentage of fines than the solids in the upper portion of disengager 40 and therefore, the solids withdrawn through side stream conduit 47 contain a higher percentage of fines than the solids withdrawn through seal leg conduit 46.

In order to secure the advantages of the invention it is necessary, with certain arrangements of the seal leg conduit outlet and the side stream conduit outlet, to provide a relatively deep compact mass of solids above the two outlets in order that the streams converging toward the two outlets will intersect each other to provide a substantial area of intersection from which area of intersection concentrated fines can be introduced from the stream converging toward the seal leg conduit into the stream converging toward the side conduit. For example, referring to Figure 1, if the compact bed gravitating toward the conduits 16 and 17 were too much less deep than the bed whose surface 26 is illustrated in Figure 1, the advantages of the invention would not be secured to any substantial degree since the two streams converging toward the two conduits would not have a substantial area of intersection. On the other hand, in the arrangement shown in Figures 3 and 4 and in the arrangements shown in Figures 5 and 6, the depth of the compact bed is not as important since the positioning of the side stream conduit 17 relative to the seal leg conduit 16 and the positioning of the side stream conduit 47 relative to the seal leg conduit 46 are such that there is a substantial area of intersection of the streams converging toward the two conduits regardless of the depth of the compact bed.

Since the arrangements shown in Figures 3, 4, 5, and 6, provide greater areas of intersection of the solids streams converging toward the outlets, by virtue of the fact that the two outlets are on the same side of the longitudinal axis of the supply hopper and lie on a radius of the supply hopper cross section, such arrangements are particularly preferred according to the present invention.

Statements herein that centers of conduits and of supply hopper outlets, such as the outlets of a disengaging vessel as previously disclosed, preferably lie on a diameter of the supply hopper cross section indicate that an imaginary straight line between the centers of the outlets, the line being extended if necessary beyond the outlets, passes through the longitudinal axis, extended if necessary, of the supply hopper. Statements that such centers, in a particularly preferred embodiment, lie on a radius of the supply hopper cross section indicate that both outlets are on the same side of the supply hopper longitudinal axis and that an imaginary straight line, between the centers of the outlets and extended beyond the innermost outlet's center, passes through that axis. Thus, in Figures 1 through 6, the outlet centers lie on a diameter, but only in Figures 3 through 6 do the centers also lie on a radius of the supply hopper cross section.

It is to be understood that, in the foregoing discussion, the frustoconical solids streams referred to do not necessarily form a complete frustoconical shape, since they may in some cases, as shown in the drawings, be bounded in such a way, by the walls of the vessel through which they gravitate and by the lift conduits, that they cannot, as they would in the absence of the obstructions, assume a complete frustoconical shape. In any event, according to the present invention, the gravitating streams of solids assume inclined undersurfaces, in at least part of their mass, which are characteristic of masses which have frustoconical shape at least in part, and from such inclined undersurfaces, the selective removal of relatively fine solids from the gravitating stream is effected according to the present invention.

The invention claimed is:

1. In a process which comprises circulating through a process system granular contact material comprising relatively fine and relatively coarse granules and which includes the steps of gravitating a relatively constricted seal leg stream of granular contact material from a relatively enlarged supply zone as a compact mass through a substantial vertical distance and of introducing a portion of the contact material in said system as an elutriator stream into an elutriating zone, the improvement which comprises: passing contact material down in said supply zone as a downwardly converging frustoconical stream and thence into a seal leg stream; passing a small portion of the contact material in said frustoconical stream down from the under surface of said frustoconical stream into a downwardly converging second frustoconical stream having lesser volumetric flow rate of solids than said first-named frustoconical stream and thence into an elutriator stream; and separately removing said elutriator stream and said seal leg stream from a lower portion of said supply zone, said elutriator stream and said seal leg stream being removed from said supply zone through outlets the horizontal distance between the centers of which is less than one-half the major dimension of the horizontal cross-section of the supply zone at the level of the outlet from which said seal leg stream is removed.

2. In apparatus for circulating through a process system granular solids comprising relatively fine and relatively coarse granules, the apparatus comprising a relatively enlarged supply hopper providing therein a space for gravitation of solids as a compact bed, an elutriator, a pressure reaction vessel beneath said supply hopper, and a relatively constricted seal leg conduit communicating with an outlet from a lower portion of said supply hopper and with said reaction vessel, the improvement which comprises: a conduit having smaller cross sectional area than that of said seal leg conduit and communicating with a second outlet from said supply hopper and with said elutriator, the horizontal distance between said second outlet and the first-named outlet being less than one-half the major dimension of the horizontal cross-section of the supply hopper at the level of said first-named outlet, the vertical frustoconical space which extends upwardly from the second outlet and which has sides inclined at the apparent angle of repose of said solids, intersecting in a substantial area of intersection within said space, the lower surface of the vertical frustoconical space which extends upwardly from the first-named outlet and which has sides inclined at the apparent angle of repose of said solids.

3. In a process which comprises circulating through a process system granular contact material comprising relatively fine and relatively coarse granules and which includes the steps of pneumatically elevating granular contact material, discharging the elevated contact material into a relatively enlarged disengaging zone; gravitating a relatively constricted seal leg stream of granular contact material from a lower portion of said disengaging zone as a compact mass through a substantial vertical distance, and introducing a portion of the contact material in said system as an elutriator stream into an elutriating zone, the improvement which comprises: passing contact material downwardly in said disengaging zone as a downwardly converging frustoconical stream and thence into said seal leg stream; passing a small portion of the contact material in said frustoconical stream down from the under surface of said frustoconical stream into a downwardly converging second frustoconical stream having lesser volumetric flow rate of solids than said first-named frustoconical stream and thence into said elutriator stream; and separately removing said elutriator stream and said seal leg stream from a lower portion of said disengaging zone, said elutriator stream and said seal leg stream being removed from said disengaging zone through outlets the horizontal distance between the centers of which is less than one-half the major dimension of the horizontal cross-section of the disengaging zone at the level of the outlet from which said seal leg stream is removed.

4. In apparatus for circulating through a process system granular solids comprising relatively fine and relatively coarse granules, the apparatus comprising a lift conduit, means for pneumatically elevating granular solids through said lift conduit, a relatively enlarged disengaging vessel communicating with the upper end of said lift conduit and providing, beneath said upper end of said lift conduit, a space for gravitation of solids as a compact bed, an elutriator, a pressure reaction vessel beneath said disengaging vessel, and a relatively constricted seal leg conduit communicating with an outlet from a lower portion of said disengaging vessel and with said reaction vessel, the improvement which comprises: a conduit having smaller cross sectional area than that of said seal leg conduit and communicating with a second outlet from said lower portion of said disengaging vessel and with said elutriator, the horizontal distance between said second outlet and the first-named outlet being less than one-half the major dimension of the disengaging vessel at the level of said first-named outlet the vertical frustoconical space which extends upwardly from the second outlet and which has sides inclined at the apparent angle of repose of said solids intersecting, in a substantial area of intersection within said space, the lower surface of the vertical frustoconical space which extends upwardly from the first-named outlet and which has sides inclined at the apparent angle of repose of said solids.

5. In a process which comprises circulating through a process system granular contact material comprising relatively fine and relatively coarse granules and which includes the steps of gravitating a relatively constricted seal leg stream of granular contact material from a relatively enlarged supply zone as a compact mass through a substantial vertical distance and of introducing a portion of the contact material in said system as an elutriator stream into an elutriating zone, the improvement which comprises: passing contact material down in said supply zone as a downwardly converging frustoconical stream and thence into a seal leg stream; passing a small portion of the contact material in said frustoconical stream down from the under surface of said frustoconical stream into a downwardly converging second frustoconical stream having lesser volumetric flow rate of solids than said first-named frustoconical stream and thence into an elutriator stream; and separately removing said elutriator stream and said seal leg stream from a lower portion of said supply zone, said elutriator stream being removed from said supply zone through an outlet whose center lies substantially within the plane defined by the center of a second outlet from which said seal leg stream is removed from said supply zone and by the longitudinal axis of said supply zone, and lies between said second outlet and said axis.

6. In apparatus for circulating through a process system granular solids comprising relatively fine and relatively coarse granules, the apparatus comprising a relatively enlarged supply hopper providing therein a space for gravitation of solids as a compact bed, an elutriator, a pressure reaction vessel beneath said supply hopper, and a relatively constricted seal leg conduit communicating with an outlet from a lower portion of said supply hopper and with said reaction vessel, the improvement which comprises: a conduit having smaller cross sectional area than that of said seal leg conduit and communicating with a second outlet from said supply hopper and with said elutriator, the vertical frustoconical space which extends upwardly from the second outlet and which has sides inclined at the apparent angle of repose of said solids intersecting in a substantial area of intersection within said space the lower surface of the vertical frustoconical space which extends upwardly from the first-named outlet and which has sides inclined at the apparent angle of repose of said solids, the center of said second outlet lying substantially within the plane defined by the center of the first-named outlet and the longitudinal axis of said supply hopper, and lying between said second outlet and said axis.

References Cited in the file of this patent

UNITED STATES PATENTS

| | | |
|---|---|---|
| 2,414,373 | Gerhold | Jan. 14, 1947 |
| 2,434,843 | Fahnestock et al. | Jan. 20, 1948 |
| 2,494,794 | Bonnell | Jan. 17, 1950 |
| 2,656,306 | Bergstrom et al. | Oct. 20, 1953 |

OTHER REFERENCES

Petroleum Processing, vol. 4 1949 February, pages 137 and 138.